May 6, 1924.  1,493,141
C. BODMER ET AL
HAND DRILL FRAME
Filed Nov. 3, 1922
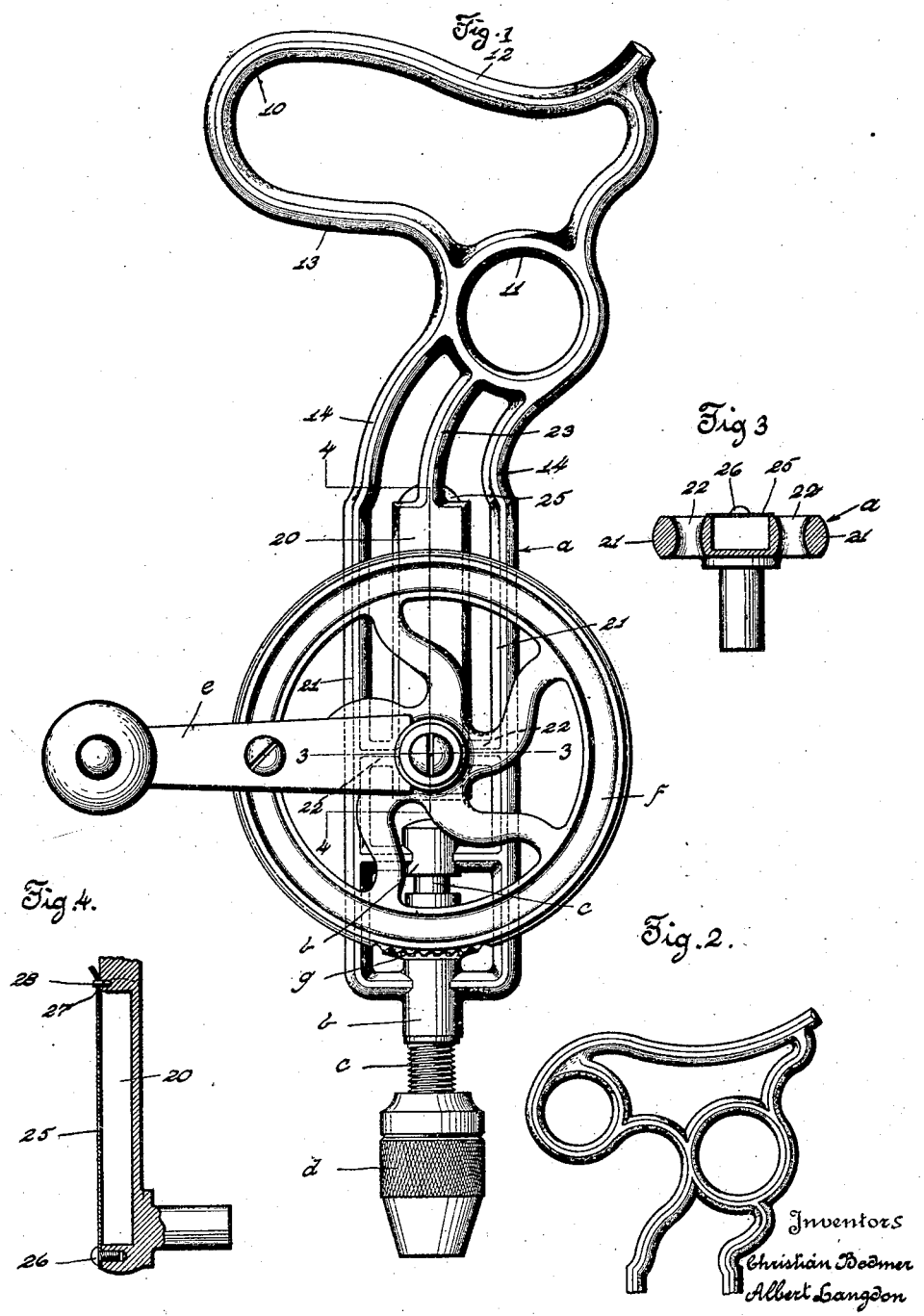
Inventors
Christian Bodmer
Albert Langdon
By Clay Lindsey
their Attorney Patented May 6, 1924.

1,493,141

UNITED STATES PATENT OFFICE.

CHRISTIAN BODMER AND ALBERT LANGDON, OF NEW BRITAIN, CONNECTICUT, ASSIGNORS TO THE STANLEY WORKS, OF NEW BRITAIN, CONNECTICUT, A CORPORATION OF CONNECTICUT.

HAND-DRILL FRAME.

Application filed November 3, 1922. Serial No. 598,740.

To all whom it may concern:

Be it known that we, CHRISTIAN BODMER and ALBERT LANGDON, citizens of the United States, and residents of New Britain, county of Hartford, State of Connecticut, have invented certain new and useful Improvements in a Hand-Drill Frame, of which the following is a specification.

One of the objects of the present invention is to provide a hand or like drill with an improved handle which may be very conveniently gripped and firmly held against turning movement. In operating drills of this sort, the act of turning the operating handle for rotating the drill spindle sets up a turning or twisting movement in the drill as a whole, making it extremely difficult and requiring a great deal of effort, where the drills are provided with a round gripping handle or breast plate, as has been usual, to hold the drill steady. The improved handle of the present invention provides a good full hand grip with which great power or leverage may be obtained with a slight amount of effort to hold the drill against such twisting or turning movements. Our improved handle is extremely convenient in use, possesses ample strength to perform its duties, and is advantageous in that the drill may be very securely held steady and firm with a minimum amount of effort on the part of the operator, and, further, the handle provides a substantial surface against which the hand may be pressed in the direction of the axis of the drill to force the drill point to its work.

A further aim of the invention is to provide a frame with a receptacle for holding the tools or drill points.

In the accompanying drawing, wherein we have shown, for illustrative purposes, two embodiments of our invention, Fig. 1 is a side view of the entire drill, showing one form of our improved handle;

Fig. 2 is a view showing a slightly different form of handle;

Fig. 3 is a transverse sectional view taken on line 3—3 of Fig. 1; and

Fig. 4 is a longitudinal sectional view taken on line 4—4 of Fig. 1 and shows the construction of the tool receptacle and the closure therefor.

Referring to the drawing in detail, $a$ denotes the body portion of the frame of the drill provided with bearings $b$ in which is journalled a tool spindle $c$ carrying the chuck $d$ for the usual drill points. By way of illustration, the drill spindle is shown as being rotated by means of an operating handle $e$ connected to a gear $f$ journalled on the frame and meshing with a pinion $g$ fixed to the tool spindle.

Preferably, the improved handle of the present invention is formed integral with the frame $a$. This handle, as shown in Fig. 1, comprises a grip portion 10 adapted to be held between the palm and the fingers of the hand, and a conveniently spaced ring-like portion 11 adapted to receive the index finger. The grip portion of the handle is in the form of a horizontally disposed U or elongated loop with its axis substantially at right angles to the axis of the tool spindle. The upper portion 12 of the loop forms a palm rest, this portion being, preferably, in the form of an ogee so as to nicely fit the palm crosswise, thus permitting the pressure of the palm to be naturally exerted to force the drill bit to its work. The lower portion 13 of the loop is also, preferably, in the form of an ogee, and about this portion the second, third and fourth fingers may be conveniently folded. The anular ring portion 11 is interposed between the grip and the frame $a$ and, as shown, is spaced forwardly of the longitudinal axis of the drill. In the present instance, the frame $a$ at its upper end is curved upwardly and forwardly as at 14 and merges into the wall of the ring-like section 11.

It will be seen that with the arrangement of handle described, the grip portion may be securely held between the palm and the fingers and since this grip portion extends transversely of the axis of the drill, considerable leverage is obtained so that the drill may be very securely held true and steady against backward thrust which is set up by operating the handle $e$ to rotate the drill spindle as the drill bit is being fed into the work. The ring-shaped part 11 provides a further security for holding the drill steady by means of the index finger. The central portion of the handle is substantially in alinement with the axis of the drill so that when the palm is pressed against the portion 12 there is a direct thrust in the direction of the length of the drill point which means that there is no tendency for the drill, as a whole, to become canted forwardly or rearwardly. The handle is preferably formed integral with the frame of the drill, making a very economical construction of great rigidity and strength.

The handle illustrated in Fig. 2 is similar to that shown in Fig. 1, except that the grip or loop portion is provided at its rear end with a ring adapted to accommodate the third or fourth finger of the hand and thus provide additional security in holding the drill steady.

For the purpose of providing the frame with a chamber adapted to hold the tools or drill points when not in use, the frame includes a hollow box-like member 20 preferably formed integral with the frame and located between the side members 21 thereof. The box-like member 20 is connected to the side members 21 by integral struts 22 and to the ring 10 by a brace 23. The box or receptacle 20 is open at the rear side of the drill frame, as shown in Figs. 3 and 4, and has a cover 25 in the form of a resilient strip or plate pivoted to the box, as by means of a screw 26. The free or upper end of the plate 25 has an opening 27 which is adapted to receive a locking pin 28 carried by the upper end of the box. To open the box, the plate 25, at its free end, is sprung outwardly to disengage it from the pin 28 and then the plate is swung edgewise on its pivot 26. With this arrangement, the tools or drill points may very conveniently be housed, and access to these tools may be readily had. The plate is locked by means of the pin 28 against accidental opening.

It is, of course, obvious that our invention is susceptible of various modifications and changes which are within the spirit of the invention without departing from the scope of the following claims, it being understood that the present disclosure of our invention is by way of illustration only and it is not to be taken as restrictive of our conception.

We claim as our invention:—

1. In a hand drill the combination with a frame, a drill spindle journaled therein and having a pinion, a large gear journaled in said frame and meshing with said pinion, an operating handle on said large gear, and a grip handle on the upper end of said frame and including an elongated loop portion disposed in a plane parallel to the plane of said gear and extending transversely of the axis of said spindle, the upper side of said loop being in the form of an ogee curve to fit the palm and the under side of said loop having an ogee curve to fit the fingers, said palm portion being substantially bisected by the line of axis of said spindle.

2. In a hand drill the combination with a frame, a drill spindle journaled therein and having a pinion, a large gear journaled in said frame and meshing with said pinion, an operating handle on said large gear, and a grip handle on the upper end of said frame and including an elongated loop portion disposed in a plane parallel to the plane of said gear and extending transversely of the axis of said spindle, the upper side of said loop being curved to fit the palm of the hand and the under side of the loop being curved to fit the fingers, said palm portion being substantially bisected by the line of axis of said spindle and said grip handle having a finger ring portion positioned at the forward lower end of said loop portion.

3. In a hand drill the combination with a frame having a pair of side members similarly curved forwardly and upwardly at their upper ends, a drill spindle journaled in the other end of said frame, a pinion on said spindle, a drive gear journaled in said frame and meshing directly with said pinion, an operating handle fixed to said gear for turning the same, and a grip handle on the outer end of said frame including a transversely extending loop having a palm portion substantially bisected by the line of axis of said spindle and disposed in the plane parallel to the plane of said gear, said loop having its palm portion substantially bisected by the line of axis of said spindle and a finger engaging portion, and a ring at the juncture of said loop and the forwardly and upwardly extending ends of said frame and positioned forwardly of the line of axis of said spindle.

CHRISTIAN BODMER.
ALBERT LANGDON.